United States Patent
Tellenbach et al.

(10) Patent No.: US 7,948,341 B2
(45) Date of Patent: May 24, 2011

(54) MOISTURE PROTECTION FOR AN ELECTROMAGNETIC COIL

(75) Inventors: Jean-Maurice Tellenbach, Hettlingen (CH); Volker Ziebart, Schlatt (CH); Hans-Rudolf Burkhard, Wila (CH)

(73) Assignee: Mettler-Toledo AG, Greifensee (CH)

( * ) Notice: Subject to any disclaimer, the term of this patent is extended or adjusted under 35 U.S.C. 154(b) by 1478 days.

(21) Appl. No.: 11/051,629

(22) Filed: Jan. 27, 2005

(65) Prior Publication Data

US 2005/0160830 A1    Jul. 28, 2005

(30) Foreign Application Priority Data

Jan. 27, 2004 (EP) .................................. 04075197

(51) Int. Cl.
*H01F 27/02* (2006.01)
(52) U.S. Cl. ............... 336/82; 336/90; 336/92; 336/96
(58) Field of Classification Search ............ 336/82, 336/90, 92, 96
See application file for complete search history.

(56) References Cited

U.S. PATENT DOCUMENTS

| | | | | |
|---|---|---|---|---|
| 3,167,732 A | * | 1/1965 | Novak | 336/205 |
| 3,208,414 A | * | 9/1965 | Reeber et al. | 112/470.09 |
| 3,336,553 A | * | 8/1967 | Cripps | 336/197 |
| 5,856,638 A | | 1/1999 | Bukhard et al. | |
| 6,127,912 A | * | 10/2000 | Dust et al. | 336/208 |
| 6,556,116 B2 | * | 4/2003 | Skinner et al. | 336/96 |
| 6,848,919 B2 | * | 2/2005 | Stitz et al. | 439/130 |
| 7,151,427 B2 | * | 12/2006 | Muller et al. | 335/278 |

FOREIGN PATENT DOCUMENTS

| | | | |
|---|---|---|---|
| CH | 504 675 | | 4/1971 |
| GB | 1 276 620 | | 11/1972 |
| JP | 57089211 A | * | 6/1982 |
| JP | S57-89211 | | 6/1982 |
| JP | 01068624 A | * | 3/1989 |
| JP | 2518171 Y2 | | 3/1996 |

\* cited by examiner

*Primary Examiner* — Anh T Mai
*Assistant Examiner* — Joselito Baisa
(74) *Attorney, Agent, or Firm* — Buchanan Ingersoll & Rooney PC

(57) ABSTRACT

A coil for an inductive sensor, such as a coil which is used in a sensor that operates according to the principle of electromagnetic force compensation for converting an amount of force generated by a load applied to a force-measuring cell into an electrical signal, is provided with protection against the penetration of moisture. The protection includes a protective covering with a surface-smoothing undercoating applied to the coil, on which a second level of coverage is applied as a protective coating against the penetration of moisture.

28 Claims, 3 Drawing Sheets

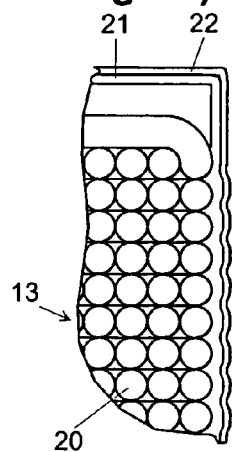
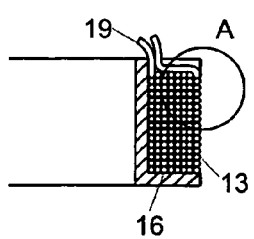
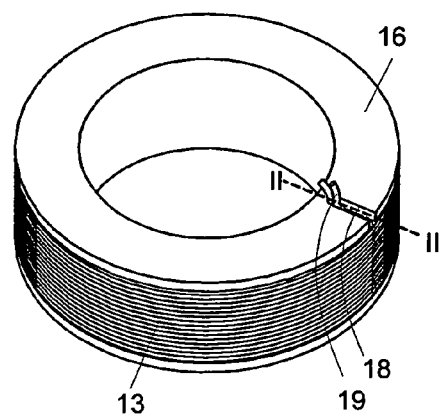
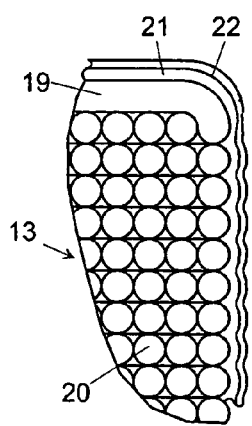
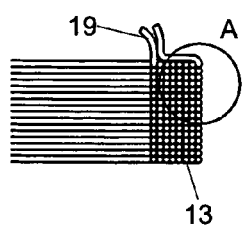
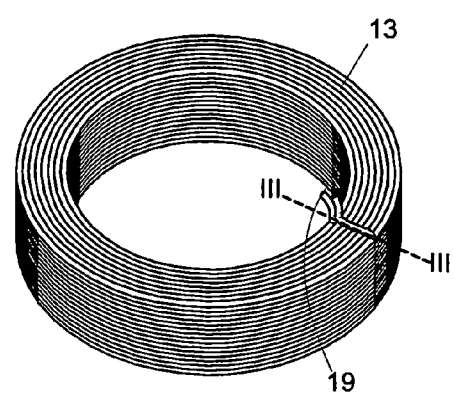

MOISTURE PROTECTION FOR AN ELECTROMAGNETIC COIL

RELATED APPLICATIONS

This application claims benefit to European Priority Patent Application Serial Number 04 075 197.6, filed Jan. 27, 2004. This priority application is hereby incorporated by reference in its entirety.

BACKGROUND

1. Field

An electromagnetic coil for an inductive sensor is disclosed, such as a coil of the type that is used in sensors that operate according to the principle of electromagnetic force compensation, wherein the coil is provided with protective means against the penetration of moisture. A force-measuring cell with this type of coil and a method of applying a protective coating to a coil are also disclosed.

2. Background Information

An inductive sensor is based for example on the concept of a coil that is movable in an inhomogeneous magnetic field, where a current is induced in the coil when the latter moves in a direction of the inhomogeneity. The induced current represents a measure for the displacement of the coil and can be used to measure a force that is causing the displacement.

In other inductive sensors of the type used with preference in force-measuring cells, a current flows through a coil that is movable in the homogeneous magnetic field of a permanent magnet. A force acting on the coil causes a displacement of the coil which is detected by an optical position sensor, whereupon a servo-control circuit changes the flow of current in the coil to the magnitude required to hold the coil in its original position again. The change in the current is commensurate with the force that is to be measured by the force-measuring cell. This measurement principle is referred to as electromagnetic force compensation.

A force-measuring device that operates according to the foregoing principle of electromagnetic force-compensation, which finds application for example in the field of weighing technology, includes a force-transfer device with a parallel-guiding mechanism and in many cases a lever mechanism for the reduction of a force, e.g. a load, to be transmitted. The sensor has a permanent magnet with an air gap, with a coil being immersed in the magnetic field in the air gap of the permanent magnet. If the force-measuring device has a lever mechanism, the coil can be arranged at the longer lever arm of the last lever. A coil of the type used here has one or more windings of an insulated metal wire, normally a copper wire. The electrical insulation of the wire is required in order to avoid electrical contact between adjacent windings.

The coil is in many cases wound on a coil former which lends the necessary degree of stability to the windings. However, there are also so-called air coils whose shape is maintained by an adhesive compound connecting the windings to each other.

Force-measuring cells that work according to the principle of electromagnetic force compensation, in particular if they are designed for a high measurement resolution, often have to meet the requirement of a high sensitivity that does not change, for example during the operation of a balance that is equipped with the force-measuring cell.

Besides other parameters not specifically mentioned here, the coil is also a contributing factor in a sensitivity change of the force-measuring cell, which is due in particular to moisture absorption of the insulating material that sheathes the coil wire. Furthermore, moisture absorption of the wire insulation causes a shift of the zero point of the force-measuring cell. The insulation of the coil wire consists in almost all cases of a polymer, for example of polyurethane, polyimide, or polyamidimide.

Moisture absorption of the insulating material of the coil wire, or generally a change in the moisture content of the insulating material which depends on the ambient humidity of the force-measuring cell, can lead for example to leakage currents between the windings. As another possible consequence of a moisture absorption or moisture release, the insulating material can swell up or shrink. The result is in both cases a geometric change of the coil, particularly of the spacing between neighboring windings, which will also lead to mechanical stress inside the coil. The change in the moisture content is further accompanied by a weight change of the coil.

All of these moisture-related effects can, overtime, cause changes in the measuring result, if this type of coil is used in an inductive measuring sensor. In particular in the case of a force-measuring cell that operates according to the principle of electromagnetic force compensation, the moisture absorption of the insulating material of the coil wire is one of the factors that can determine the sensitivity of the measuring cell.

The existing state of the art includes a variety of measures that have been proposed or are used in practice to avoid or at least reduce moisture absorption in a coil.

As an example, a ring-shaped sleeve of aluminum is shrink-fitted on a coil that is wound on a coil former. Due to the thermal expansion that occurs when the sleeve is heated up, it can be fitted over the coil former on which the coil has been wound, and in the subsequent cooling, the aluminum sleeve contracts itself snugly against the coil and the coil former, whereby a certain sealing effect is achieved against an exchange of moisture with the environment. In some cases, if a higher degree of seal-tightness is required, the sleeve is welded to the coil former, leaving only a passage opening for the conductor leads to the coil, which requires additional sealing by means of a lacquer.

In the effort to improve the measuring results in an environment with relatively high humidity fluctuations, for example between 20% and 80% relative air humidity, satisfactory results—at least in force-measuring cells with relatively low sensitivity requirements—are also achieved with a thick lacquer coating applied directly to a coil and solidified by a thermal treatment.

A watertight encapsulation of the coil component of the electromagnetic unit of an electromagnetic balance is disclosed in JP 25 18171 Y2, the disclosure of which is hereby incorporated by reference in its entirety. The coil is arranged on a coil former that is configured in such a way that the coil windings lie in a recessed part of the coil former. The coil is enclosed inside the recessed space of the coil former by means of a watertight ring sleeve that is fitted to the coil former. A tightly holding snap connection exists between the coil former and the watertight ring sleeve.

Ring sleeves used as sealing enclosures have the drawback that the overall weight of the coil is increased, but their most decisive disadvantage is that the geometric dimension of the coil, particularly its thickness, is strongly enlarged, so that the width of the air gap of the permanent magnet has to be adapted accordingly. However, enlarging the air gap of a magnet system that is otherwise unchanged decreases the magnetic field in the air gap, which has a negative effect on the sensitivity of the sensor. If the same sensitivity is to be maintained with an enlarged air gap, a larger magnet system will be required which will, however, be more difficult to handle and more expensive to manufacture.

Furthermore, coils that are sealed in accordance with the existing state of the art still require special sealing measures at the passage opening for the conductor leads to the coil. The aforementioned lacquer seal does not provide the necessary seal-tightness to achieve the low moisture-absorption values that are required for a high sensitivity in the case of force-measuring cells with a high measurement resolution. The same can also be said to the aforementioned method of sealing the entire coil with a lacquer coating.

SUMMARY

A coil with a simple and highly effective protective shield against moisture, is disclosed.

A coil for an inductive sensor, such as a coil of the type that is used in sensors that operate according to the principle of electromagnetic force compensation for converting an amount of force generated by a load applied to a force-measuring cell into an electrical signal, is provided with protective means against the penetration of moisture. The protective means include a protective covering with a first level of coverage being applied to the coil to even out the surface of the coil, and a second level of coverage arranged on top of the first level as a protective coating against moisture penetration.

A first a first level of coverage is adhesively applied as surface-smoothing base cover to the windings of the coil or to the insulation thereof, respectively. The surface-smoothing base cover fills up the gaps between the individual windings creating a flattened surface with a much reduced surface structure compared to the surface of the coil. The smoothened surface serves as base for the actual moisture protection coating.

The protective coating can be adapted according to the demands on the sensitivity of sensor including the coil. The protective coating is quite thin compared to the surface-smoothing base cover, as it is grown on top of a smoothened surface.

In an advantageous embodiment of a coil used in a force-measuring cell with a force-measuring device and a sensor operating according to the principle of electromagnetic force compensation for converting the amount of force induced by a load into an electrical signal, with the coil being movable in the magnetic field of a permanent magnet in one dimension, the coil is provided with protective measures against moisture penetration. These measures include a protective coating with a first surface-smoothing base cover applied directly to the coil and a second protective coating, which acts as barrier against moisture penetration and is deposited on top of the first surface-smoothing base cover.

In an advantageous embodiment, a protective coating of the type just described is configured inhomogeneously over the range of the coating thickness. This reduces the incidence of hairline breaks or micro-pores in the protective coating.

In an exemplary embodiment, the protective coating is a multilayered coating with an alternating sequence of layers with strong barrier properties and intermediate layers. The intermediate layers have the purpose to seal the remaining micro-pores and hairline breaks or fissures in the respectively adjacent barrier layers. As a result, micro-pores and hairline breaks will not continue through the entire thickness of the coating but will be at different locations in the next barrier layer, whereby a kind of labyrinth is set up against the penetration of moisture.

As a particularly beneficial effect of a multilayered protective coating that is underlaid with a surface-smoothing base cover, strongly curved surfaces where an inorganic barrier layer would be particularly prone to develop the aforementioned micro-pores or hairline breaks because of localized stresses including in particular thermal stresses, and where micro-pores and hairline breaks would have a special tendency to attach themselves, are rounded out on the one hand by the underlying base of the protective coating, so that the occurrence of micro-pores and micro-fractures is reduced from the outset, and on the other hand the micro-pores and hairline breaks are covered by the intermediate layers whereby the aforementioned labyrinth effect is set up against the penetration of moisture.

In an advantageous embodiment, the protective coating has a sequence of barrier layers alternating with intermediate polymer layers. Intermediate polymer layers, in particular if they are deposited from the liquid phase or from a liquid solution, have the advantage that they further enhance the flattening effect of the surface-smoothing undercoating, so that the subsequent barrier layers are deposited on surfaces of progressively lower surface roughness.

In a particularly advantageous embodiment, the protective coating is made entirely of inorganic materials. A multilayered coating can in this case be configured with a sequence of alternatingly different inorganic materials and/or with a sequence of alternatingly different stoichiometric compositions of an inorganic material including, or consisting of, at least two components, and/or with a sequence of alternatingly varying structural parameters of an inorganic material.

It is a particularly favorable aspect of inorganic multilayered protective coatings that they can be produced in a single work operation and in a single coating-deposition apparatus, respectively.

These inorganic protective coatings, in particular of individual layers of the latter if the coating is configured as a multilayered coating, have the special property that they have a tendency to grow in a conforming manner on their underlying base surface when they are applied by means of plasma-enhanced chemical vapor deposition (PECVD). This means that the coating has a substantially constant thickness independent of the angle at which different locations of the underlying base surface are oriented in relation to the orientation of the source during the deposition process. Thus, even strongly curved surfaces, for example at the coil ends, receive the same amount of coverage by the protective coating as the side surfaces of the coil that are at least partially smoothed out by the smoothing base cover. Accordingly, the protection effect against moisture penetration is optimized.

In an exemplary embodiment, the protective coating can have a sequence of silicon oxide layers and silicon nitride layers. Protective coatings of this type are disclosed in WO 03/050894, the disclosure of which is hereby incorporated by reference in its entirety, as a means for covering electronic devices, in particular indicating devices such as light-emitting devices or liquid crystal displays.

In another exemplary embodiment, a protective coating especially of an inorganic type is configured with a continuous variation of one or more parameters, in particular of the chemical composition of the coating material, over the range of the coating thickness.

This continuous variation can occur on the one hand in multilayered coatings in such a way that the coating parameters are not changing abruptly, but that their profile rather resembles a sine function. On the other hand, the inhomogeneity can occur in a continuous transition over the entire thickness of the protective coating, as a gradient of one or more of the coating material parameters. This variant is particularly preferred for producing thin protective coatings.

In an example of a method for producing a protective coating with at least one continuously varying parameter, the source changes its material composition during the deposition process, or the protective coating is deposited from two sources whose deposition rates vary, i.e., the rate from one source increases as a function of time while the rate from the other source decreases, and/or vice versa.

As is self-evident, the coating thickness of a protective coating is determined on the basis of the required barrier effect, which has to be stronger in the case of sensors with a high measurement sensitivity as opposed to sensors for applications with less stringent requirements in regard to accuracy and/or sensitivity. In the field of weighing technology, for example, an inductive sensor with a high sensitivity is used with preference in a force-measuring cell for officially certifiable balances or for a comparator balance. The barrier effect is, however, also dependent on the materials used for the protective coating and on how they are arranged in the protective coating. In other words, the barrier effect depends on the structure and configuration of the protective coating. A protective coating should also have a sufficiently high degree of elasticity so that it can conform to a slight dimensional change in the coil due to thermal expansion without thereby losing its barrier effect against the penetration of moisture. This can be achieved particularly well through thin inorganic protective coatings or barrier layers within a protective coating. Of course, economic factors also come into play in determining the optimal coating thickness of a protective coating and/or in determining the number of layers to use in a protective coating.

The thickness of the second level of coverage of the covering, which functions as protective coating, can be in the range from a few hundred nanometers to a few microns, and the thickness of the individual layers is of the order of 100 nanometers up to 500 nanometers. The thickness of the first, surface-smoothing base cover is determined in accordance with the surface structure of the coil which depends on the wire diameter. This undercoating can have a thickness of a few microns ranging up towards a hundred micron.

The coil in an inductive sensor as described above can be either an air coil, which means that the windings are held together in coil shape by an adhesive material, or it can be a coil with a coil former on which the one or more coil wires are wound. In the former case, the entire coil needs to be provided all around with a protective coating, while in the latter case only the exposed parts of the coil windings need to be coated, but the coating could also be extended over the entire coil former.

A coil that is equipped with the protective coating can be configured without an encapsulation of the type that belongs to the existing state of the art as described hereinabove. Consequently, a coil with a larger number of windings can be used with a given width of the air gap in a permanent magnet, or a permanent magnet with a narrower air gap can be selected for a sensor with a given number of coil windings. Both measures can lead to a significant improvement of the sensitivity of the inductive sensor.

In another embodiment, in a case where an encapsulation is desired, the coil can be arranged on a coil former and provided with an encapsulation device and at least the parts of the coil that are not sealed by the encapsulation, such as the connecting wires and/or the boundaries between the encapsulation and the coil former can be covered by the protective coating.

In an exemplary embodiment, the protective coating can be provided with a cover layer that shields the protective coating above all from extraneous mechanical factors. The materials used for the cover layer include, for example, polymers with an exceptionally low moisture absorptivity, and they also include silicone.

A production method for a protective covering of a coil includes the steps of applying a first level of coverage to the coil to smooth out the surface, and to deposit on the surface-smoothing base coating a second level of coverage functioning as a protective coating against the penetration of moisture.

BRIEF DESCRIPTION OF THE DRAWINGS

The invention will be described hereinafter with reference to examples that are schematically illustrated in the drawings, wherein:

FIGS. 3a-3c illustrate an exemplary coil arranged on a coil former without encapsulation in a form of a representation analogous to FIGS. 2a) through 2c);

FIGS. 4a-4c illustrate an exemplary air coil without encapsulation in a form of a representation analogous to FIGS. 2a) through 2c);

DETAILED DESCRIPTION

Figure 1:
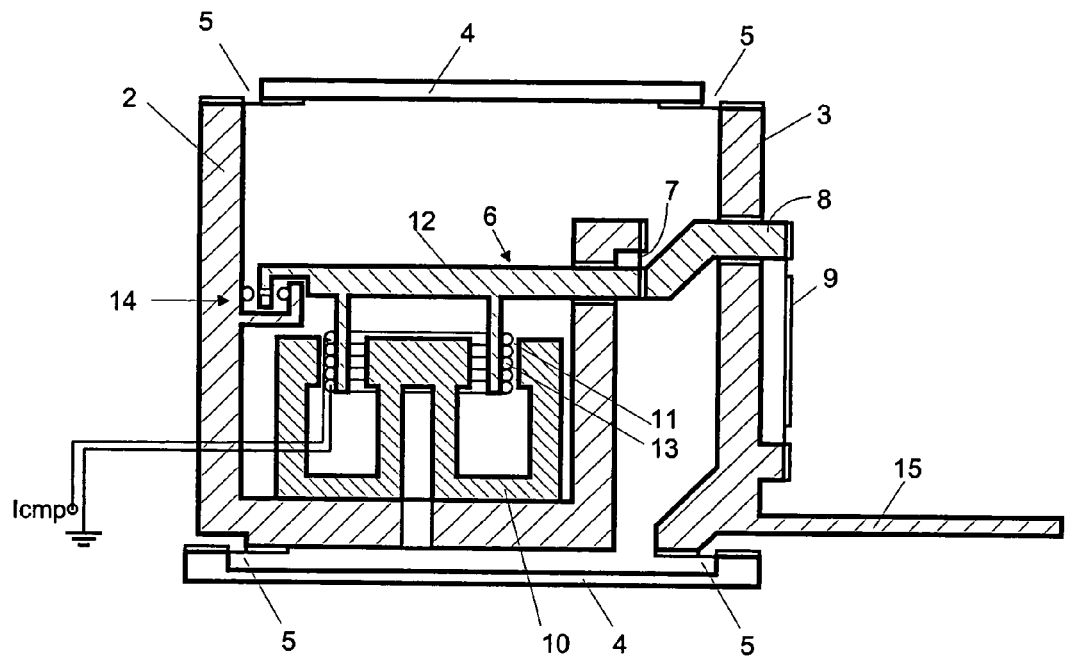
FIG. 1 illustrates a principle of an exemplary force-measuring cell, shown in a side view, which functions according to the principle of electromagnetic force compensation.

In an illustration of a pronounced schematic character, FIG. 1 shows an exemplary force-measuring cell 1 of a type that is suitable for use in the field of weighing technology, where the force-measuring cell 1 functions according to the principle of electromagnetic force compensation. The force-measuring cell 1 includes a force-transmitting device with a parallel-guiding mechanism that has a stationary portion 2 and a vertically displaceable portion 3 that is movably constrained by a pair of guide members 4 which are connected to the stationary portion 2 and the vertically displaceable portion 3 by way of flexure joints 5. The vertically displaceable portion 3 includes a cantilevered extension 15 serving to receive a load that is to be measured. The perpendicular vector component of the force that is caused by a weighing load is transferred from the vertically displaceable portion 3 to the short lever arm 8 of the lever 6 by way of a coupling element 9. The lever 6 is supportively pivoted on a part of the stationary portion 2 by means of a flexure fulcrum 7. The force-measuring cell further includes a cup-shaped permanent magnet system 10 which is mounted through a fixed connection on the stationary portion 2 and which has an air gap 11. A coil 13 connected to the longer lever arm 12 of the lever 6 is arranged in the air gap 11. A compensation current $I_{cmp}$ flows through the coil 13, with the magnitude of the current $I_{cmp}$ depending on the magnitude of the force acting on the lever 6. The position of the lever 6 is measured by an electro-optical measuring device 14 that is connected to a servo device which regulates the compensation current $I_{cmp}$ in response to the measurement signals received so that the lever 6 is always held in the same position, or is returned to the same position after it has been displaced due to a change in the weighing load.

Figure 2C:
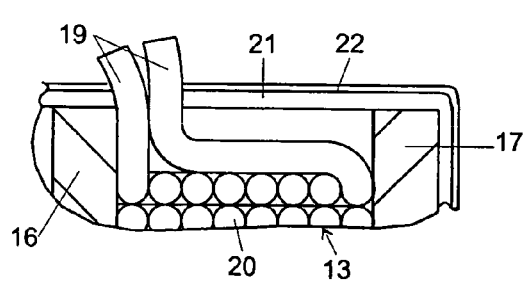
in FIG. 2c) as a detail view of the portion framed by the circle A in FIG. 2b) with a protective coating in the area of the passage opening to the electrical conductor leads; and in FIG. 2d) as a detail view of the portion framed by the circle B in FIG. 2b)
Figure 2A:
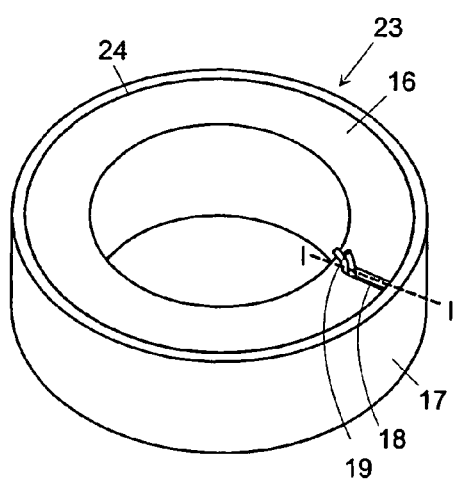
FIG. 2 illustrates the arrangement of an exemplary coil of the type that is used in force-measuring cells according to FIG. 1, in FIG. 2a) with a state-of-the-art encapsulation in a perspective view.
in FIG. 2b) as a sectional view along the line I-I of FIG. 2a)

FIG. 2a) illustrates a coil arrangement 23 of the type that is used in force-measuring cells 1 according to FIG. 1, with an encapsulation by means of a sealing sleeve ring 17 in conformance with the existing state of the art. The coil 13 is arranged on a toroid-shaped coil former 16 and encapsulated moisture-tight by means of the sealing sleeve ring 17 that ends flush with the coil former 16. Only the opening 18 for the passage of the electrical conductor leads 19 to the coil 13 is excepted from the encapsulation and therefore forms an entry passage allowing moisture to reach the coil and in particular the insulating material of the coil, whereby the undesirable effects are caused that were mentioned herein at the beginning, such as leakage currents between neighboring coil windings or a change in the geometry of the coil, in particular in the spacing between adjacent windings due to the swelling of the insulating material.

Figure 2D:
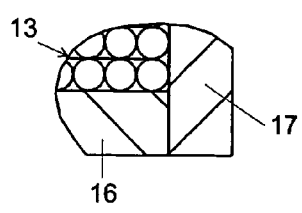
Figure 2B:
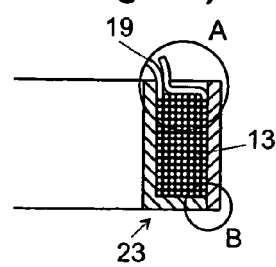

In a sectional view along the line I-I of FIG. 2a), FIG. 2b) illustrates how the individual windings 20 are arranged inside the encapsulation that is constituted on one side by the coil former 16 and on the other side by the sealing sleeve ring 17. FIG. 2c) illustrates the detail framed by the circle A in FIG. 2b), and FIG. 2d) illustrates the detail framed by the circle B in FIG. 2b). FIG. 2c) shows how the coil former 16 is covered at the top in the area of the opening 18 by a protective covering with a surface-smoothing undercoating 21 and a protective coating 22. The opening can be additionally closed off with a lacquer, or the material of the surface-smoothing coating is applied in the area of the opening in such a way that the lacquer closes off the opening. If the entire top side and underside of the coil former 16 are provided with the protective covering, the boundary area 24 between the coil former 16 and the sealing sleeve ring 17 will likewise be sealed. In cases where coil former 16 and the sealing sleeve ring 17 are joined only through surface contact, sealing the boundary area 24 in this manner has been found very useful as a means to reduce the penetration of moisture.

FIG. 3a) gives a perspective view of a coil 13 without encapsulation where the coil 13 is, however, arranged on a coil former 16. A coil former 16 used in this arrangement consists preferably of a non-magnetic material such as copper or aluminum. FIG. 3b) represents a sectional view along the line II-II of the coil 13 that is arranged on the coil former 16, and FIG. 3c) represents a magnified view of the detail A of FIG. 3b). FIG. 3c) explains how the protective covering with the surface-smoothing undercoating 21 and the protective coating 22 is arranged on the outside of the coil 13 as well as on at least a part of the topside (and analogously, the underside) of the coil former 16. The coil former 16 does not have to be coated in its entirety, given that it includes, or consists of, a metal, for example copper, which is known to be moisture-tight.

FIG. 4 illustrates an air-cored coil in an analogous form of representation as FIG. 3. An air-cored coil or air coil in the present context means a coil 13 that is not supported by a coil former 16. The protective covering which, in this case too, is composed of a surface-smoothing undercoating 21 and a protective coating 22 needs to be deposited on all surfaces of the air coil 13.

The material in the protective coating 22 is not necessarily of a homogenous composition, stoichiometry, or structure. As has been shown, inhomogeneous protective coatings have a highly efficient barrier effect against moisture penetration. Inhomogeneous coatings that may be considered include multilayered coatings as well as coatings with a continuous variation of one or more material parameters, in particular of the chemical composition, over the range of the coating thickness.

A multilayered coating can, includes, or consist of, individual layers of materials with a strong barrier effect, such as inorganic materials, that are arranged in the protective coating in an alternating sequence with intermediate polymer layers. The intermediate polymer layers serve to cover micro-pores and hairline breaks of the adjacent barrier layers in order to achieve overall a strong barrier effect of the protective coating.

Figure 5:
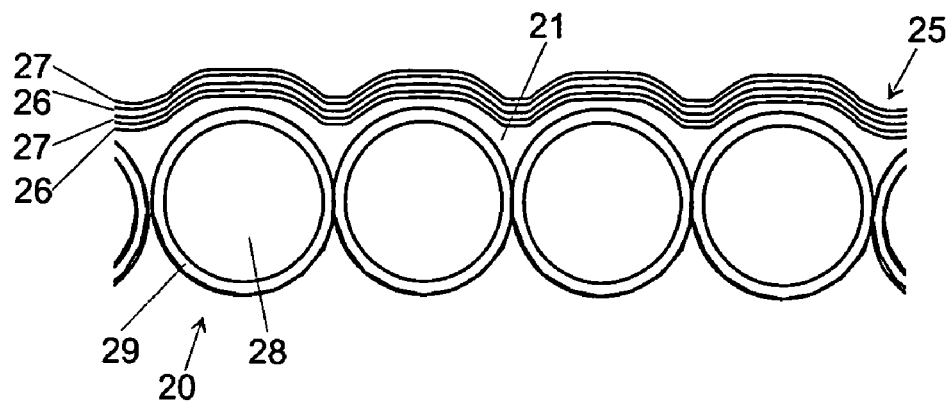
FIG. 5 illustrates an exemplary multilayered coating arranged on the outermost winding layer with a surface-smoothing undercoating, shown in a strongly magnified sectional view.

FIG. 5 illustrates an example of a protective covering on a coil in the form of a multilayered coating, showing a strongly magnified detail of the coil surface with an outer layer of windings 20 of a wire 28 with an insulation 29. The outer layer of windings is provided with a protective covering that includes a surface smoothing undercoating 21 and a multilayered coating 25. The multilayered coating 25 in the illustrated example consists of four individual layers. However, the number of layers in a multilayered coating 25 is not determined as an a priori defined value but depends on the requirements of a maximally tolerable moisture permeability of the overall coating, and it is also a function of the materials used. Multilayered coatings with three, four, five or more individual layers can be used.

The first layer of the multilayered coating 25 is a barrier layer 26. This first barrier layer 26 is followed for example by an intermediate polymer layer 27. The intermediate polymer layer 27 has the functions of stabilizing the first barrier layer 26 as well as covering up micro-pores or hairline breaks and thereby reducing the incidence of these defects in a further barrier layer 26 which follows the intermediate layer 27. The reduction in the number of micro-pores or hairline breaks is credited to a certain surface-smoothing effect of the intermediate polymer layers.

However, the intermediate layer prevents in particular that the small number of micro-pores or hairline breaks that will still occur in a second barrier layer 26 attach themselves to the micro-pores or hairline breaks of the first barrier layer 26, a condition that would again favor the entry of moisture. Rather, with the micro-pores or hairline breaks occurring in respectively different locations in the first barrier layer 26 and further barrier layers 26, a kind of labyrinth is set up against the entry of moisture, in particular water or to a lesser extent also solvent molecules. In a multilayered protective coating 25 with an alternating sequence of barrier layers 26 and intermediate layers 27, this labyrinth effect leads to a drastic reduction in moisture penetration.

The barrier layers 26 and intermediate layers 27 of a protective coating 25 do not necessarily have to follow each other in a regular sequence, although this can be done because it simplifies the manufacturing process.

The materials for the barrier layers 26 can be selected from a multitude of the known, predominantly inorganic insulating materials that can be applied by different deposition processes. Examples to be mentioned here are oxides, nitrides, fluorides, carbides, borides, or combinations thereof, in particular oxi-nitrides, mixtures of oxides, or also ceramic mixtures. In particular silicon oxide, titanium oxide, tantalum oxide, zirconium oxide, hafnium oxide, aluminum oxide, chromium oxide, aluminum nitride, silicon nitride, titanium nitride, titanium fluoride, and silicon carbide have proven to be suitable materials for barrier layers 26. Layers of so-called "diamond-like carbon" can likewise be used as barrier layers 26.

Other materials that can be used for the barrier layers 26 also particularly include metals, for example silver, aluminum, gold, chromium, copper, nickel, titanium, as well as alloys, for example nickel-cobalt alloys, or intermetallic compounds, for example of aluminum and copper, of tungsten and copper, or of titanium and aluminum.

Besides acrylate polymers or inorganic-organic hybrid polymers (as described for example in EP 0 610 832 A2) there are also further polymer materials that can be used for the intermediate layers 27. One could name for example polymeric amides, alkyds, styrols, xylylenes, phenylenes, aldehydes, esters, urethanes, epoxides, imides, phenols, ketones as well as fluor polymers or copolymers, to give only an open-ended listing. In the end, an optimizing compromise between barrier effect, compatibility of the barrier layer 26 with the intermediate layer 27, for example their adhesion to each other, as well as economical aspects of the deposition method will lead to the decision on which materials to use, respectively, for the barrier layers 26 and the intermediate layers 27.

Furthermore, one can also use inorganic materials for the intermediate layers 27 of the multilayered protective coating 25 of the type shown in FIG. 5. The materials to consider include predominantly inorganic insulating materials. An inorganic protective coating 25 that can be mentioned as an example has a sequence of thin layers of silicon nitride and silicon oxide, wherein the sequence of 100 to 200 nm of silicon nitride (barrier layer 26), 100 nm of silicon oxide (intermediate layer 27), 100 nm of silicon nitride (barrier layer 26), 100 nm of silicon oxide (intermediate layer 27), and 100 nm of silicon nitride (barrier layer 26) represents a preferred arrangement, as the silicon nitride in particular is highly effective as a barrier against the penetration of moisture. The silicon oxide layer, although this material can likewise by credited with a barrier property, has the primary function within the multilayered coating to close off the possibly occurring micro-pores or hairline breaks in the silicon nitride layer. Thus, a multilayered coating 25 includes, or consists of, at least three layers, for example, five layers, of inorganic materials.

The layers 26, 27 of the multilayered protective coating 25 can also be composed of an inorganic material including, or consisting of, at least two components, wherein the stoichiometric composition of the components changes from one layer to the next. As an example of materials suitable for multilayered coatings 25 with an alternating sequence of layers 26, 27 of different stoichiometric composition, one could name silicon oxi-nitrides with the respective contents of oxide and nitride varying from one layer to the next.

A relatively small layer thickness can be selected for purely inorganic protective coatings 25, as these materials exhibit a relatively strong barrier effect even for thin layers of silicon nitride, while on the other hand attention needs to be paid to the aspect of rigidity, so that the protective coating can adapt itself to a thermal expansion of the coil if necessary and will not become defective. Observing the latter constraint, purely inorganic protective coatings 25 can be applied with an overall thickness of a few hundred nanometers up to a few microns, in the case of multilayered coatings with layer thicknesses of 50 to 500 nanometers.

A large selection of deposition methods is available for the application of a multilayered coating 25. Examples for producing the barrier layers 26 and/or the aforementioned inorganic intermediate layers 27 that should be named here include vapor deposition in vacuum, vapor deposition in air, plasma deposition, microwave plasma deposition, sputtering, sol-gel methods, chemical vapor deposition (CVD), combustion chemical vapor deposition (CCVD), plasma enhanced chemical vapor deposition (PECVD), plasma impulse chemical vapor deposition (PICVD), as well as electrochemical deposition which is used in particular for the deposition of metals.

The following deposition techniques are possible for the application of intermediate polymer layers 27: spray application, brush application, and immersion coating, in-situ polymerization of monomers or oligomers that have been deposited by flash evaporation, as well as electrophoresis, cataphoresis, or anaphoresis.

In cases where harsh mechanical wear conditions are expected, the protective covering is provided with a cover coating (not shown) which shields the protective coating 22, 25 primarily against extraneous mechanical influences. Polymers with an especially low absorptivity for moisture, such as polyacrylates, inorganic-organic hybrid polymers or silicones, are used with particular preference for this purpose.

An exemplary embodiment of a coating for the protection of a coil 13 in an inductive sensor has a surface-smoothing undercoating 21 of an inorganic-organic hybrid polymer. This surface-smoothing undercoating 21 can be applied by means of an immersion process in which a cylindrical coil 13 rests on rollers while a part of the cylindrical outside surface of the coil is immersed in the liquid hybrid polymer which is present in the form of a solution. As the rollers rotate, the coil revolves in the opposite direction so that the entire circumference area is uniformly covered by the liquid polymer. After a hardening phase where the undercoating 21 is exposed to an increased temperature between 80° C. and 130° C. at which the inorganic-organic hybrid polymer is crosslinked, the coil is placed in a PECVD coating apparatus and provided with a protective coating of several layers of silicon nitride in alternation with silicon oxide. The method of plasma-enhanced chemical vapor deposition (PECVD) has the advantage that the coil 13 can be set up in a simple holder device in the coating apparatus, as the plasma surrounds the entire coil surface and as a result, the coating material is deposited everywhere on the coil in a surface-conforming manner.

Figure 6:
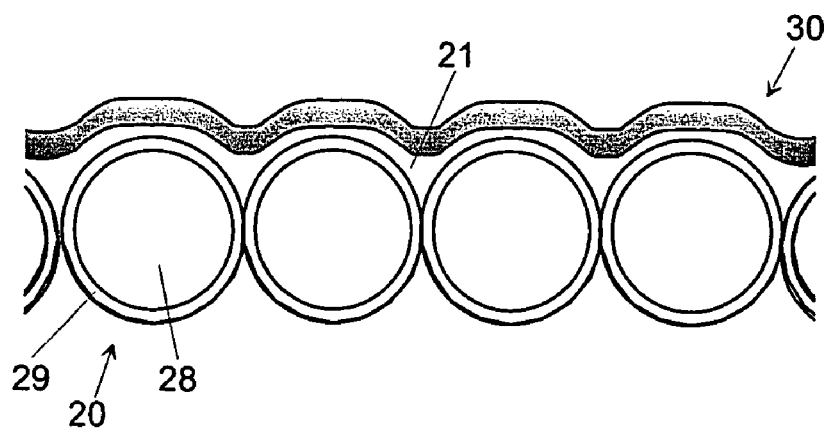
FIG. 6 illustrates an exemplary protective coating, featuring a continuous variation of one or more material parameters, arranged on the outermost winding layer with a surface-smoothing undercoating, shown in a strongly magnified sectional view.

A coil 13 with a protective coating 30 on the outmost windings, where the protective coating 30 comprises a coating with a continuous variation of one or more material parameters indicated by the gray shading over a surface-smoothing undercoating 21, is shown in FIG. 6 in a strongly magnified sectional view. In this embodiment the variation of the material parameter occurs continuously over the entire coating thickness. The variation represents a gradient of the chemical composition of the material. The protective coating 30 was produced in a PECVD coating apparatus, where the coating material was deposited from two sources with varying deposition rates, one with silicon oxide and one with silicon nitride. The rate from one source increased as a function of time while the rate from the other source decreased.

The situation is different if the coating material for the protective coating 22 is, e.g., vapor-deposited or applied by sputtering, in which case no uniform protective coatings can grow because of the shadow effect. This problem can be solved by, for example, revolving the coil 13 in the coating apparatus, so that all of the surfaces to be coated can be turned towards the material source.

The coil 13 or coil arrangement 23 that is provided with one of the coverings of the foregoing description with a surface-smoothing first level of coverage 21 on which a second level of coverage 22 is applied as a protective coating against moisture penetration has been described and illustrated in preferred embodiments. However, based on the teachings disclosed herein, those skilled in the pertinent art will be able to realize further embodiments. To name a particular example, the force-measuring cell 1 which has been described in the context of FIG. 1 and which is provided with a coated coil does not necessarily have to be equipped with a force-reducing lever system, as the inductive sensor can also be connected directly to the vertically displaceable portion 3.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An electromagnetic coil comprising:
a plurality of windings; and
a protective covering, the protective covering comprising:
a first coating comprising a surface-smoothing under coating disposed on the windings; and
a second multilayered coating disposed on the first coating, the multilayered coating comprising at least one barrier layer comprising an inorganic material and at least one intermediate layer comprising an inorganic material, wherein the second coating defines a barrier to the penetration of moisture of a nature so as to prevent changes in sensitivity of the coil during operation thereof caused by penetration of moisture, wherein the barrier layers and intermediate layers alternate in sequence and wherein the barrier layers and the intermediate layers comprise different inorganic materials and/or different stoichiometric compositions of an inorganic material comprising at least two components and/or an inorganic material in which structural parameters vary.

2. A coil according to claim 1, wherein the first coating has a chemical composition that is different than both the at least one barrier layer and the at least one intermediate layer.

3. An electromagnetic coil comprising:
a plurality of windings; and
a protective covering, the protective covering comprising:
a first coating comprising a surface-smoothing under coating disposed on the windings; and
a second multilayered coating disposed on the first coating, the multilayered coating comprising at least one barrier layer and at least one intermediate layer, wherein the second coating defines a barrier to the penetration of moisture of a nature so as to prevent changes in sensitivity of the coil during operation thereof caused by penetration of moisture, and wherein the first coating has a chemical composition that is different than both the at least one barrier layer and the at least one intermediate layer.

4. Coil according to claim 3, wherein the windings comprise wire having an insulating covering disposed thereon.

5. Coil according to claim 3, wherein the at least one barrier layer is adjacent to the at least one intermediate layer, and the at least one intermediate layers and the at least one barrier layer have different chemical compositions.

6. Coil according to claim 3, wherein the barrier layers and intermediate layers alternate in sequence.

7. Coil according to claim 6, wherein the barrier layers comprise inorganic material and the intermediate layers comprise polymer material.

8. Coil according to claim 6, wherein the barrier layers and the intermediate layers comprise an inorganic material.

9. Coil according to claim 3, wherein the coil is arranged on a coil former, and the coil former is at least partially covered by the protective covering.

10. Coil according to claim 9, wherein the coil has an encapsulation device and at least parts that are not sealed by encapsulation, including connecting wires of the coil and/or if applicable, boundary areas between a coil former and the encapsulation device, are covered by the protective covering.

11. Coil according to claim 3, wherein the coil is used in a sensor that is configured to operate according to a principle of electromagnetic force compensation for converting an amount of force generated by a load applied to a force-measuring cell into an electrical signal ($I_{cmp}$).

12. Force-measuring cell with a force-transmitting mechanism and with a sensor that functions according to a principle of electromagnetic force compensation for converting an amount of a force generated by a weighing load into an electrical signal ($I_{cmp}$), wherein the sensor comprises: a coil that is movable in one dimension in a magnetic field of a permanent magnet, the coil being configured in accordance with claim 3.

13. Method of applying a protective covering to a coil of claim 3, comprising:
applying the first, surface-smoothing level of coverage to the coil; and
depositing on the first, surface-smoothing level of coverage, the second level of coverage as a protective coating against penetration of moisture.

14. Method according to claim 13, wherein applying of the surface-smoothing level of coverage is performed by an immersion process.

15. Method according to claim 13, wherein applying of the protective coating is performed by a method of plasma-enhanced chemical vapor deposition (PECVD).

16. Method according to claim 13, wherein applying of the protective coating is performed by vapor deposition or sputtering, wherein the coil is revolving during a coating process.

17. An electromagnetic coil comprising:
a plurality of windings; and
a protective covering, the protective covering comprising:
a first coating comprising a surface-smoothing under coating disposed on the windings; and
a second coating disposed on the first coating, the second coating comprises one or more material characteristics varying throughout a the entire thickness of the coating thereby defining a barrier to moisture penetration of a nature so as to prevent changes in sensitivity of the coil during operation thereof caused by penetration of moisture.

18. Coil according to claim 17, wherein the material characteristics include chemical composition.

19. Coil according to claim 17, wherein the characteristics vary continuously throughout the entire thickness of the coating.

20. Coil according to claim 17, wherein the windings comprise wire having an insulating covering disposed thereon.

21. Coil according to claim 17, wherein the coil is used in a sensor that is configured to operate according to a principle of electromagnetic force compensation for converting an amount of force generated by a load applied to a force-measuring cell into an electrical signal ($I_{cmp}$).

22. Force-measuring cell with a force-transmitting mechanism and with a sensor that functions according to a principle of electromagnetic force compensation for converting an amount of a force generated by a weighing load into an electrical signal ($I_{cmp}$), wherein the sensor comprises: a coil that is movable in one dimension in a magnetic field of a permanent magnet, the coil being configured in accordance with claim 17.

23. An electromagnetic coil comprising:
a plurality of windings; and
a protective covering, the protective covering comprising:
    a first coating comprising a surface-smoothing under coating disposed on the windings; and
    a second multilayered coating disposed on the first coating, the multilayered coating comprising at least one inorganic barrier layer and at least one intermediate polymer layer, wherein the second coating defines a barrier to the penetration of moisture of a nature so as to prevent changes in sensitivity of the coil during operation thereof caused by penetration of moisture and wherein the at least one intermediate polymer layer seals micropores and hairline breaks in the least one inorganic barrier layer.

24. Coil according to claim 23, wherein the multilayered coating comprises at least three layers.

25. Coil according to claim 24, wherein the multilayered coating comprises at least five layers.

26. A coil according to claim 23, wherein the first coating has a chemical composition that is different than both the at least one barrier layer and the at least one intermediate layer.

27. An electromagnetic coil comprising:
a plurality of windings; and
a protective covering, the protective covering comprising:
    a first coating comprising a surface-smoothing under coating disposed on the windings; and
    a second coating disposed on the first coating, the second coating deposited from sources having different chemical compositions by increasing a rate of deposition from a first source over time while decreasing a rate of deposition from another source over time, thereby defining a gradient of chemical composition varying continuously throughout the entire thickness of the second coating.

28. A coli according to claim 27, wherein the second coating defines a barrier to moisture penetration of a nature so as to prevent changes in sensitivity of the coil during operation thereof caused by penetration of moisture.

* * * * *